United States Patent
Duru

(10) Patent No.: US 10,479,386 B2
(45) Date of Patent: Nov. 19, 2019

(54) COLLAPSIBLE CART ASSEMBLY

(71) Applicant: Chidebele Duru, Aurora, CO (US)

(72) Inventor: Chidebele Duru, Aurora, CO (US)

( * ) Notice: Subject to any disclaimer, the term of this patent is extended or adjusted under 35 U.S.C. 154(b) by 0 days.

(21) Appl. No.: 15/873,645

(22) Filed: Jan. 17, 2018

(65) Prior Publication Data

US 2019/0217878 A1    Jul. 18, 2019

(51) Int. Cl.
  *B62B 3/02* (2006.01)
  *B62B 3/00* (2006.01)

(52) U.S. Cl.
  CPC ............ *B62B 3/022* (2013.01); *B62B 3/006* (2013.01); *B62B 3/005* (2013.01); *B62B 2203/073* (2013.01)

(58) Field of Classification Search
  CPC ........... B62B 3/02; B62B 3/022; B62B 3/025; B62B 3/027
  See application file for complete search history.

(56) References Cited

U.S. PATENT DOCUMENTS

| | | | |
|---|---|---|---|
| 2,901,262 A | 8/1959 | Berlin | |
| 3,913,935 A | 10/1975 | McGillicuddy | |
| 7,168,715 B1 | 1/2007 | Friedman | |
| D546,018 S | 7/2007 | Goodell | |
| 7,246,814 B2 | 7/2007 | Prather et al. | |
| 7,703,776 B1 | 4/2010 | Nugent | |
| 8,109,477 B1 * | 2/2012 | Blasbalg | B65F 1/004 248/101 |
| 8,733,786 B1 * | 5/2014 | James | A47C 4/42 280/47.34 |
| 8,844,949 B2 | 9/2014 | White et al. | |
| 2014/0183844 A1 * | 7/2014 | Iryami | B62B 3/027 280/659 |

FOREIGN PATENT DOCUMENTS

WO    WO2005068274    7/2005

* cited by examiner

*Primary Examiner* — Bryan A Evans

(57) ABSTRACT

A collapsible cart assembly includes a frame and a pair of supports. Each of the supports is pivotally coupled to the frame. Each of the supports is selectively positioned in a first position having each of the supports extending away from the frame. Each of the supports is selectively positioned in a second position having each of the supports resting against the frame. A base is pivotally coupled to the frame. The base is selectively positioned in a deployed position having the base being oriented perpendicular with respect to the frame. In this way the frame, supports and the base defines a cart. The base is selectively positioned in a folded position having the base being oriented collinear with the frame. A plurality of boxes is each of the boxes is removably coupled between the pair of supports. Each of the boxes may contain objects for transporting the objects in the cart.

12 Claims, 6 Drawing Sheets

COLLAPSIBLE CART ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to cart devices and more particularly pertains to a new cart device for PURPOSE.

BRIEF SUMMARY OF THE INVENTION

An embodiment of the disclosure meets the needs presented above by generally comprising a frame and a pair of supports. Each of the supports is pivotally coupled to the frame. Each of the supports is selectively positioned in a first position having each of the supports extending away from the frame. Each of the supports is selectively positioned in a second position having each of the supports resting against the frame. A base is pivotally coupled to the frame. The base is selectively positioned in a deployed position having the base being oriented perpendicular with respect to the frame. In this way the frame, supports and the base defines a cart. The base is selectively positioned in a folded position having the base being oriented collinear with the frame. A plurality of boxes is each of the boxes is removably coupled between the pair of supports. Each of the boxes may contain objects for transporting the objects in the cart.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
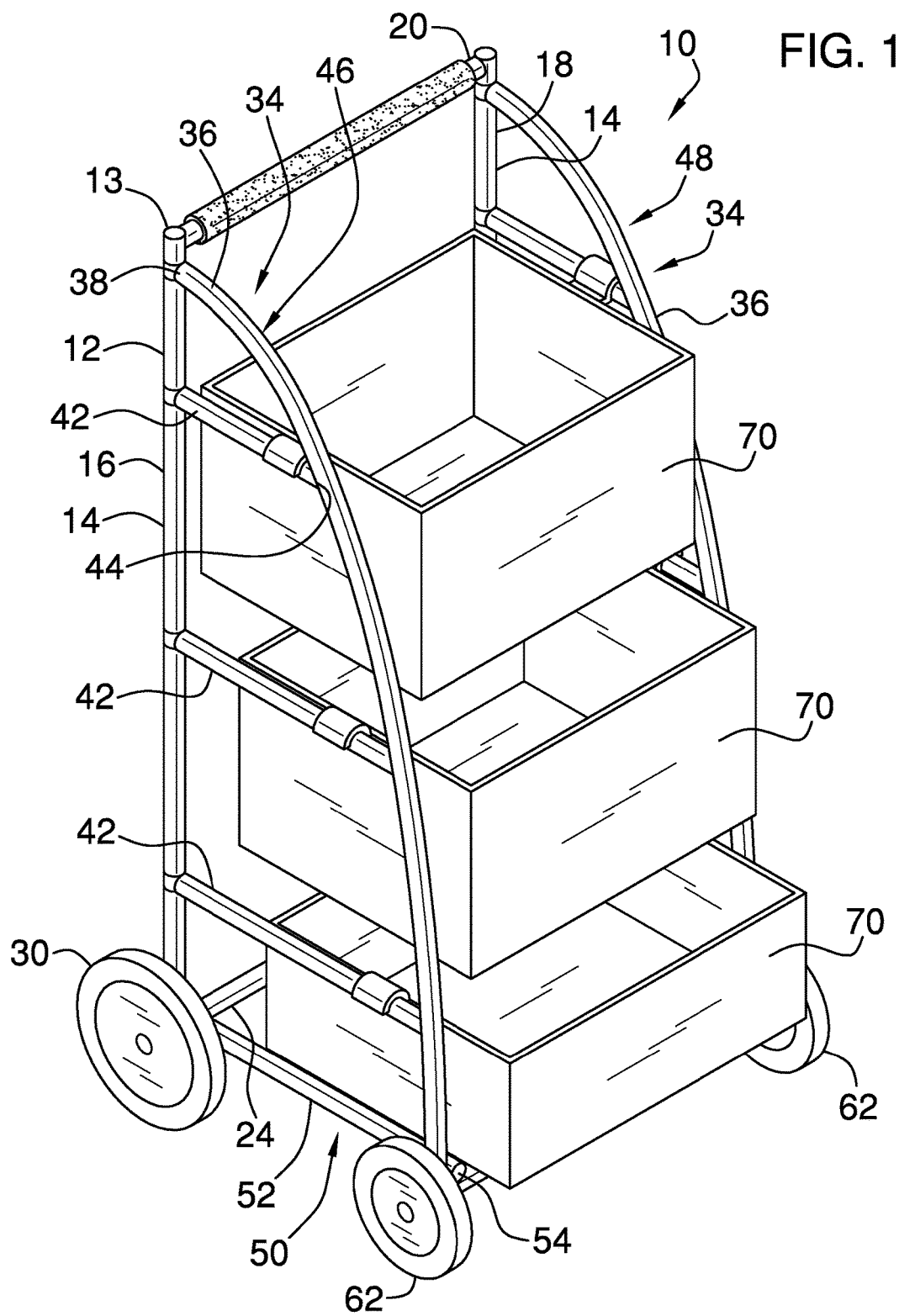
FIG. 1 is a perspective view of a collapsible cart assembly according to an embodiment of the disclosure.
Figure 2:
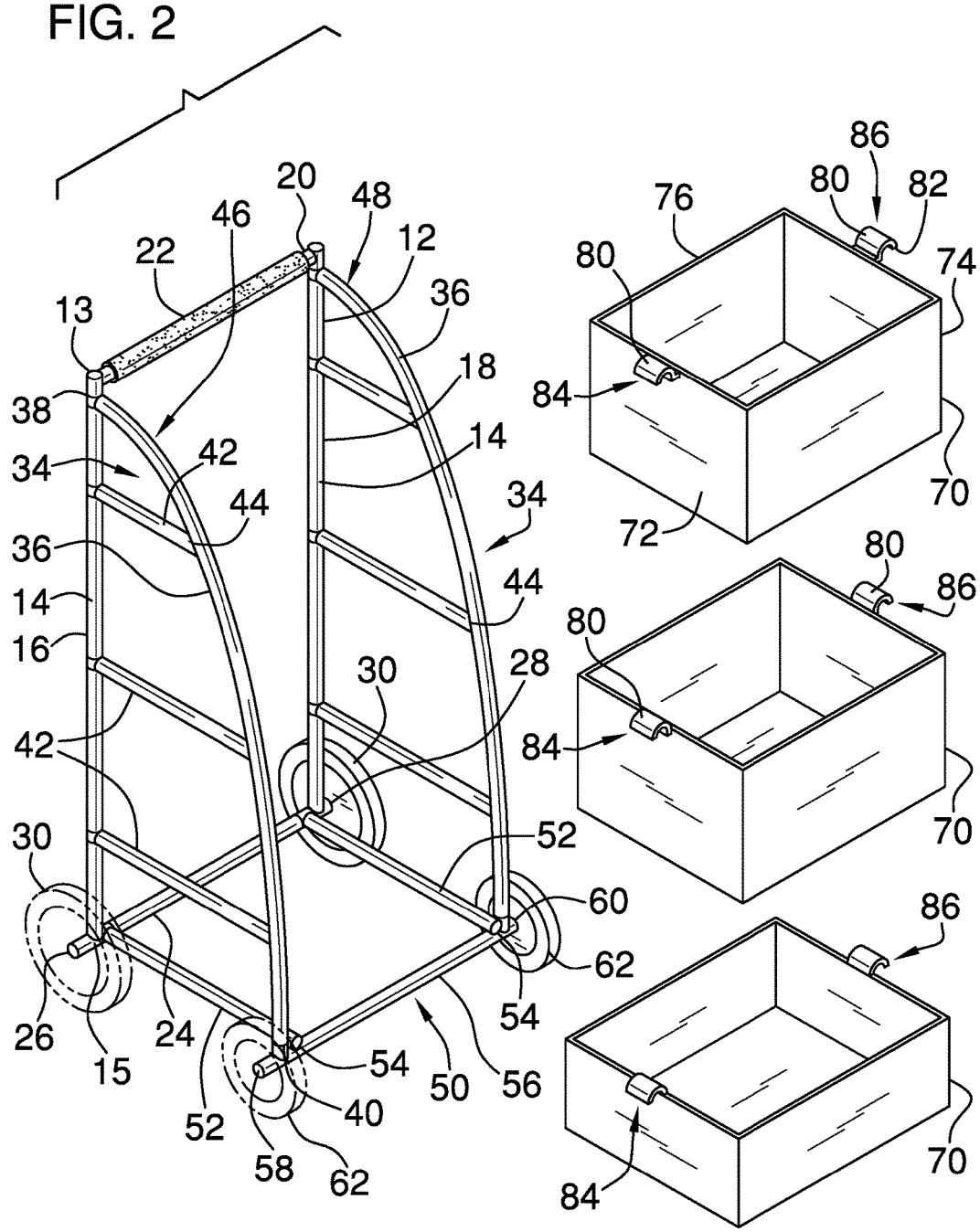
FIG. 2 is a front perspective view of an embodiment of the disclosure.
Figure 3:
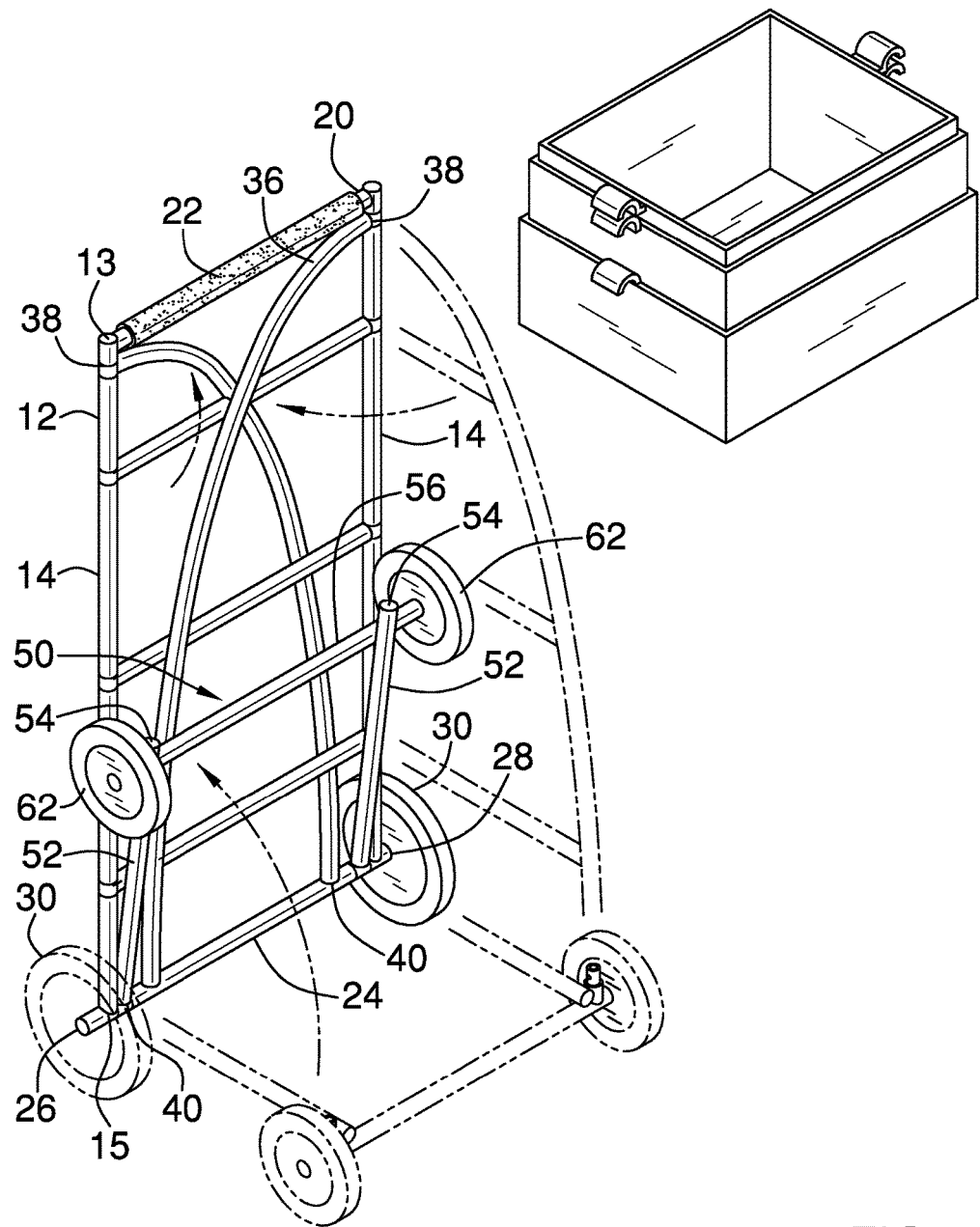
FIG. 3 is a perspective view of an embodiment of the disclosure showing a pair of supports in a second position and a base in a folded position.
Figure 4:
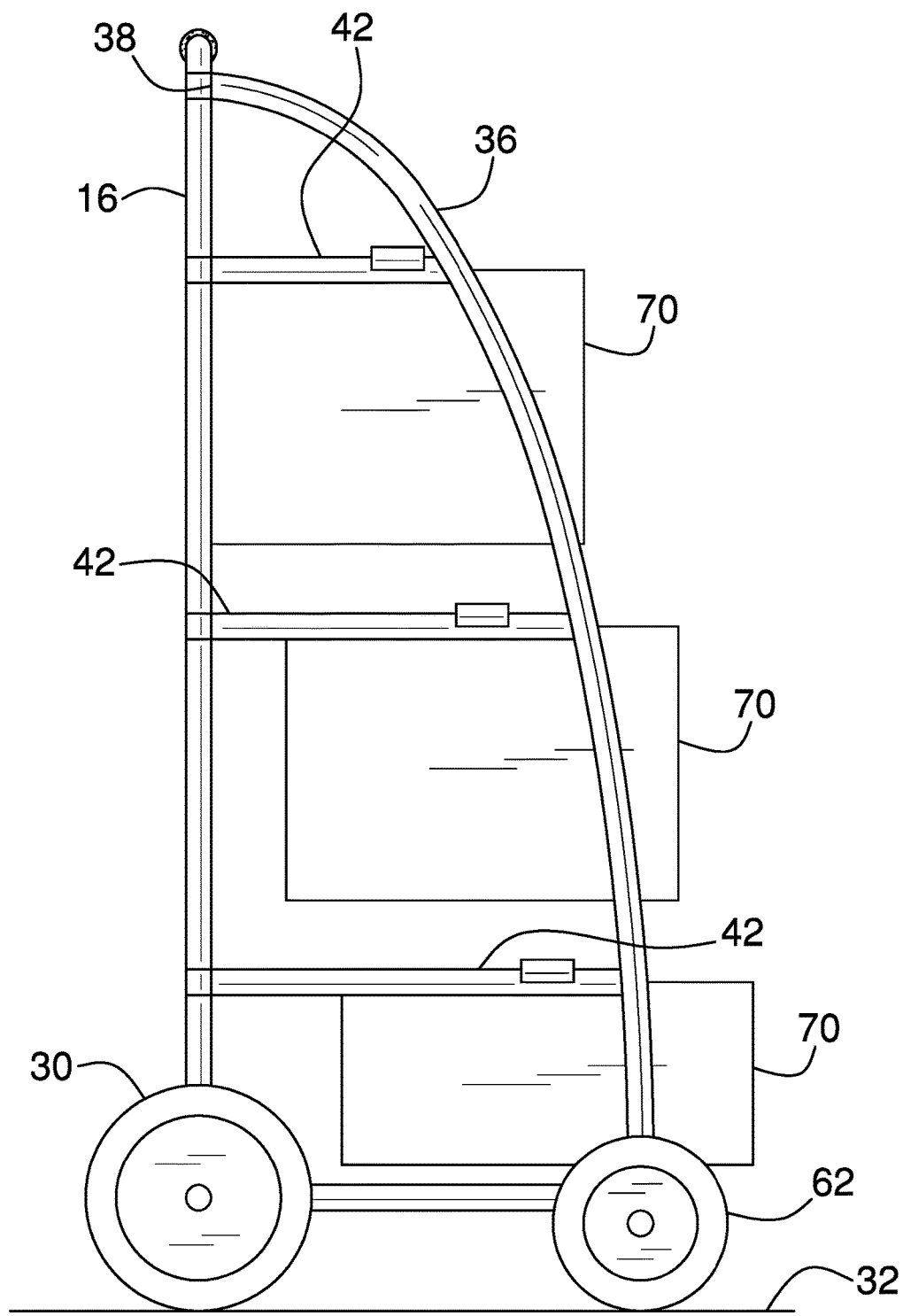
FIG. 4 is a right side view of an embodiment of the disclosure.
Figure 5:
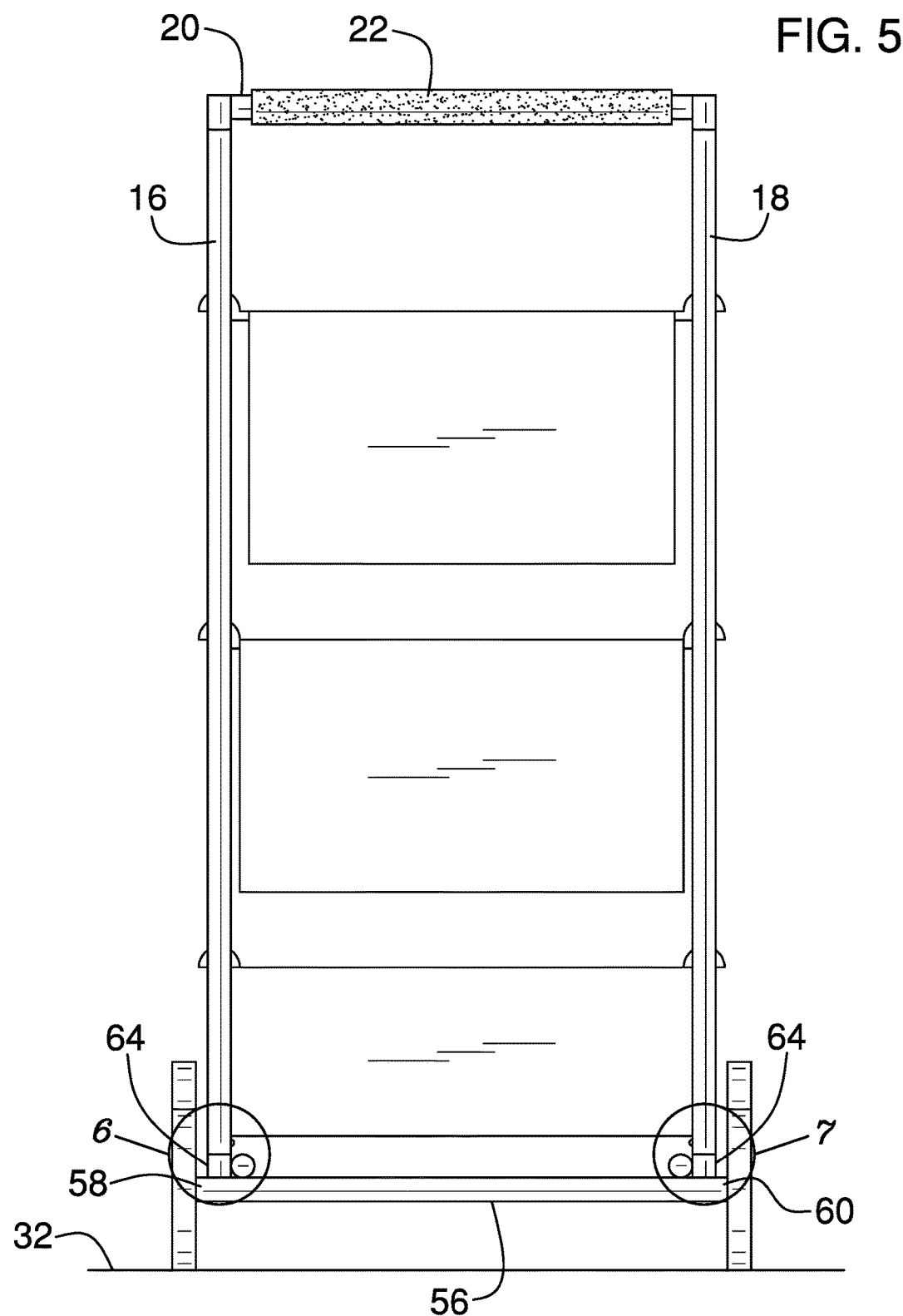
FIG. 5 is a front view of an embodiment of the disclosure.
Figure 6:
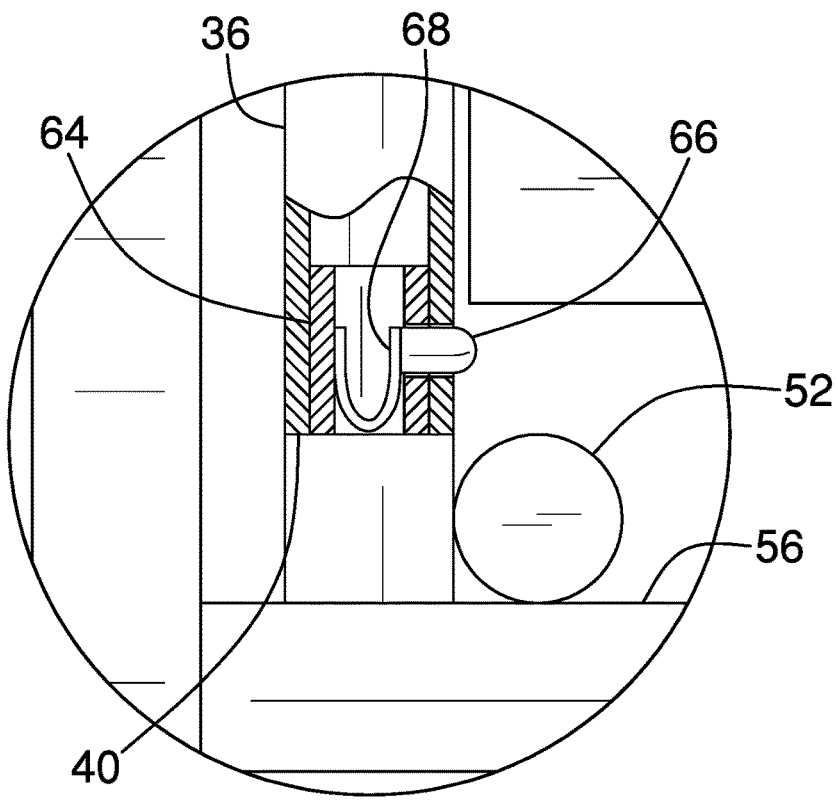
FIG. 6 is a detail view taken from circle 6 of FIG. 5 of an embodiment of the disclosure.
Figure 7:
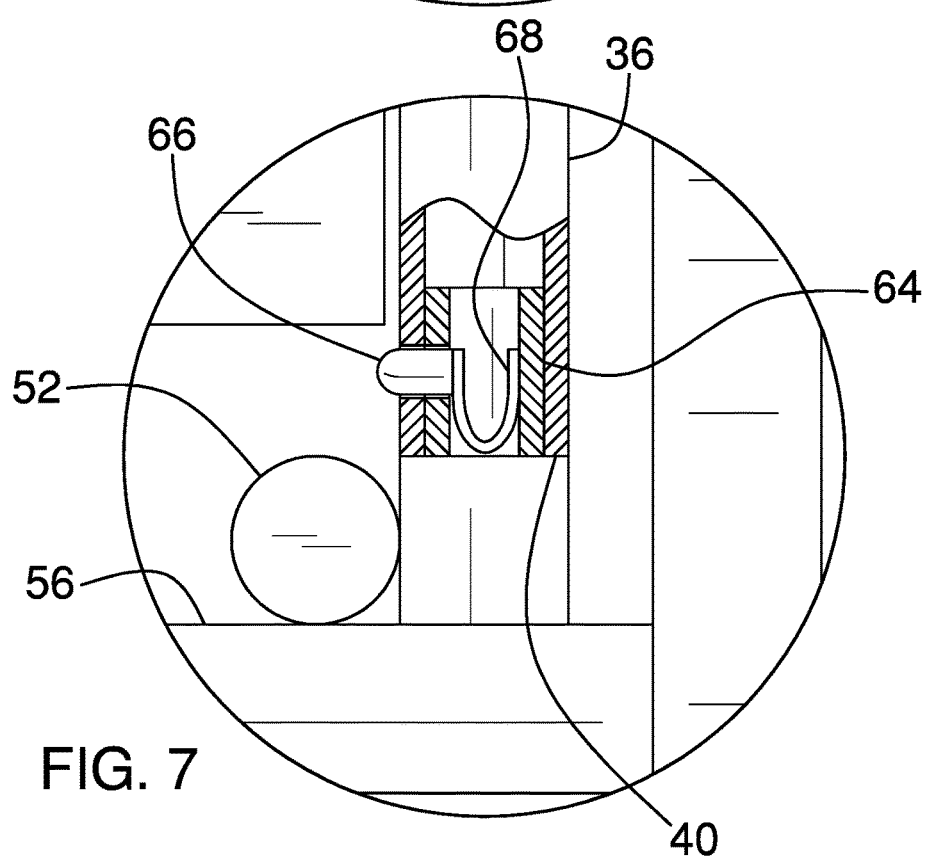
FIG. 7 is a detail view taken from circle 7 of FIG. 5 of an embodiment of the disclosure.

With reference now to the drawings, and in particular to FIGS. 1 through 7 thereof, a new cart device embodying the principles and concepts of an embodiment of the disclosure and generally designated by the reference numeral 10 will be described.

As best illustrated in FIGS. 1 through 7, the collapsible cart assembly 10 generally comprises a frame 12 that comprises a pair of vertical members 14. Each of the vertical members 14 has a first end 13 and a second end 15. Additionally, the pair vertical members 14 includes a first vertical member 16 and a second vertical member 18. The frame 12 includes a top member 20 extending between the vertical members 14. The top member 20 is aligned with the first end 13 corresponding to each of the vertical members 14 and the top member 20 is gripped. A pad 22 is positioned around the top member 20. The pad 22 is comprised of a resiliently compressible material to enhance gripping the top member 20.

The frame 12 includes a bottom member 24 extending between the vertical members 14. The bottom member 24 is aligned with the second end 15 corresponding to each of the vertical members 14. Moreover, the bottom member 24 extends laterally beyond each of the vertical members 14 to define a primary end 26 of the bottom member 24 and a secondary end 28 of the bottom member 24. A pair of first wheels 30 is each rotatably coupled to an associated one of the primary end 26 and the secondary end 28 of the bottom member 24. Each of the first wheels 30 rolls along a support surface 32 such as ground, a floor and any other horizontal support surface 32.

A pair of supports 34 is provided and each of the supports 34 is pivotally coupled to the frame 12. Each of the supports 34 is selectively positioned in a first position having each of the supports 34 extending away from the frame 12. Each of the supports 34 is selectively positioned in a second position having each of the supports 34 resting against the frame 12.

Each of the supports 34 comprises a rod 36 that has a first end 38 and a second end 40. The rod 36 is curved between the first end 38 and the second end 40 of the rod 36 and the first end 38 of the rod 36 is pivotally coupled to the frame 12.

Each of the supports 34 includes a plurality of arms 42 and each of the arms 42 is coupled to and extends away from the rod 36. Each of the arms 42 has a distal end 44 with respect to the rod 36 and the distal end 44 corresponding to each of the arms 42 is pivotally coupled to the frame 12. The pair of supports 34 includes a first support 46 and a second support 48. The rod 36 and each of the arms 42 corresponding to the first support 46 is positioned on the first vertical member 16 of the frame 12. The rod 36 in each of the arms 42 corresponding to the second support 48 is positioned on the second vertical member 18 of the frame 12.

A base 50 is provided and the base 50 is pivotally coupled to the frame 12. The base 50 is selectively positioned in a deployed position having the base 50 being oriented perpendicular with respect to the frame 12. In this way the frame 12, the supports 48 and the base 50 defines a cart. Additionally, the base 50 is selectively positioned in a folded position having the base 50 being oriented collinear with the frame 12. The base 50 comprises a pair of pivotal members 52 and each of the pivotal members 52 is pivotally coupled to the bottom member 24. Each of the pivotal members 52 has a distal end 54 with respect to the bottom member 24. Each of the pivotal members 52 is oriented perpendicular to the bottom member 24 when the base 50 is positioned in the deployed position.

A front member 56 is coupled to and extends between each of the pivotal members 52. The front member 56 is aligned with the distal end 44 corresponding to each of the pivotal members 52. The front member 56 extends outwardly beyond each of the pivotal members 52 to define a first end 58 and a second end 60 of the front member 56. The second end 40 of the rod 36 corresponding to each of the supports 34 releasably engages the front member 56 when the base 50 is positioned and the deployed position to retain the base 50 and the deployed position. A pair of second wheels 62 is each rotatably coupled to an associated one of the first end and the second end of the front member 56. Each of the second wheels 62 rolls along the support surface 32 when the base 50 is positioned in the deployed position.

A pair of tubes 64 is coupled to and extends upwardly from the front member 56. The tubes 64 are spaced apart from each other on the front member 56. A pair of fingers 66 is provided and each of the fingers 66 is positioned in an associated one of the tubes 64. Additionally, each of the fingers 66 extends outwardly and laterally through the associated tube 64. A pair of biasing members 68 is provided and each of the biasing members 68 is positioned between an associated one of the fingers 66 and an associated one of the tubes 64. Each of the biasing members 68 biases the associated finger 66 to extend outwardly through the associated tube 64.

The second end 40 of each of the rods 36 of the supports 34 is open and the second end 40 of each of the rod 36s insertably receives an associated one of the tubes 64 when the supports 34 are positioned in the first position. Moreover, each of the fingers 66 engages the corresponding rod 36 to releasably retain the supports 34 in the first position. Each of the fingers 66 is urged inwardly to release the corresponding rod 36 from the tube thereby facilitating the supports 34 to be positioned in the second position.

A plurality of boxes 70 is provided and each of the boxes 70 is removably coupled between the pair of supports 34.

Each of the boxes 70 may contain objects for transporting the objects in the cart. The objects may be grocery bags and any other object. Each of the boxes 70 has a first lateral side 72, a second lateral side 74 and a top edge 76. The top edge 76 defines an opening 78 in each of the boxes 70.

A plurality of engagements 80 is provided and each of the engagements 80 is coupled to an associated one of the boxes 70. Each of the engagements 80 engages an associated one of the arms 42 on an associated one of the supports 34. In this way each of the boxes 70 is suspended from the associated arms 42. The plurality of engagements 80 has a distal end 82 with respect to the associated box 70. Moreover, each of the engagements 80 is concavely arcuate between the associated box 70 and the distal end 82 of the engagements 80. In this way each of the engagements 80 conforms to the associated arm 42. Each of the engagements 80 is aligned with the top edge 76 of the associated box 70.

The plurality of engagements 80 includes a set of first engagements 84 and a set of second engagements 86. Each of the first engagements 84 is positioned on the first lateral side 72 of the associated box. Each of the first engagements 84 engages the associated arm 42 corresponding to the first support 46. Conversely, each of the second engagements 86 is positioned on the second lateral side 74 of the associated box. Each of the second engagements 86 engages the associated arm 42 corresponding to the second support 48.

In use, each of the supports 34 is positioned in the second position and the base 50 is positioned in the folded position for storage. The base 50 is positioned in the deployed position and each of the supports 34 is positioned in the first position. Additionally, the second end 40 of the rod 36 on each of the supports 34 is manipulated to insertably receive an associated one the tubes 64. Each of the boxes 70 is positioned on the associated arm 42 and the objects are loaded into the boxes 70. The top member 20 is gripped and the objects are transported along the supports 34 surface. In this way a physically disabled person is assisted with transporting groceries between a vehicle and a home or the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A collapsible cart assembly being configured to transport objects between a vehicle and a building, said assembly comprising:

a frame being configured to be gripped, said frame includes a first vertical member and a second vertical member;

a pair of supports, each of said supports being pivotally coupled to said frame, each of said supports being selectively positioned in a first position having each of said supports extending away from said frame, each of said supports being selectively positioned in a second position having each of said supports resting against said frame, each of said supports comprising
  a rod having a first end and a second end, said rod being curved between said first end and said second end of said rod, said first end of said rod being pivotally coupled to said frame, and
  a plurality of arms, each of said arms being coupled to and extending away from said rod, each of said arms having a distal end with respect to said rod, said distal end corresponding to each of said arms being pivotally coupled to said frame, each of said arms having a convex upper surface;

said pair of supports including a first support and a second support, said rod and each of said arms corresponding to said first support being positioned on said first vertical member of said frame, said rod in each of said arms corresponding to said second support being positioned on said second vertical member of said frame;

a base being pivotally coupled to said frame, said base being selectively positioned in a deployed position having said base being oriented perpendicular with respect to said frame such that the frame, supports and base defines a cart, said base being selectively positioned in a folded position having said base being oriented collinear with said frame; and a plurality of boxes, each of said boxes being removably coupled between horizontally aligned pairs of said arms of said pair of supports wherein said plurality of boxes is vertically arranged between said pair of supports and each of said boxes is configured to contain objects for transporting the objects in said cart; and a plurality of engagements, each of said engagements being coupled to an associated one of said boxes, each of said engagements engaging and associated one of said arms on an associated one of said supports, said plurality of engagements having a distal end with respect to said associated box, each of said engagements being concavely arcuate between said associated box and said distal end of said engagements complementary to convexity of said upper surface of said associated arm such that each of said engagements conforms to said associated arm.

2. The assembly according to claim 1, wherein said frame comprises a pair of vertical members, each of said vertical members having a first end and a second end, said pair vertical members including a first vertical member and a second vertical member.

3. The assembly according to claim 2, further comprising a top member extending between said vertical members, said top member being aligned with said first end corresponding to each of said vertical members wherein said top member is configured to be gripped.

4. The assembly according to claim 3, further comprising a bottom member extending between said vertical members, said bottom member being aligned with said second end corresponding to each of said vertical members, said bottom member extending laterally beyond each of said vertical members to define a primary end of said bottom member and a secondary end of said bottom member.

5. The assembly according to claim 4, further comprising a pair of first wheels, each of said first wheels being rotatably coupled to an associated one of said primary end and said secondary end of said bottom member wherein each of said first wheels is configured to be ruled along a support surface.

6. The assembly according to claim 3, further comprising a pad being positioned around said top member, said pad being comprised of a resiliently compressible material wherein said pad is configured to enhance gripping said top member.

7. The assembly according to claim 4, wherein said base comprises a pair of pivotal members, each of said pivotal members being pivotally coupled to said bottom member, each of said pivotal members having a distal end with respect to said bottom member, each of said pivotal members, each of said pivotal members being oriented perpendicular to said bottom member when said base is positioned in said deployed position.

8. The assembly according to claim 7, further comprising:
  each of said supports having a rod, said rod corresponding to each of said supports having a second end; and
  a front member being coupled to and extending between each of said pivotal members, said front member being aligned with said distal end corresponding to each of said pivotal members, said front member extending outwardly beyond each of said pivotal members to define a first end and a second end of said front member, said second end of said rod corresponding to each of said supports releasably engaging said front member when said base is positioned and said deployed position to retain said base and said deployed position.

9. The assembly according to claim 8, further comprising:
  a pair of first wheels; and
  a pair of second wheels, each of said second wheels being rotatably coupled to an associated one of said first end and said second end of said front member wherein each of said second wheels is configured to roll along the support surface when said base is positioned in said deployed position.

10. The assembly according to claim 1, further comprising each of said engagements being aligned with a top edge of said associated box.

11. The assembly according to claim 10, wherein said plurality of engagements includes a set of first engagements and a set of second engagements, each of said first engagements being positioned on a first lateral side of said associated box, each of said first engagements engaging said associated arm corresponding to said first support, each of said second engagements being positioned on a second lateral side of said associated box, each of said second engagements engaging said associated arm corresponding to said second support.

12. A collapsible cart assembly being configured to transport objects between a vehicle and a building, said assembly comprising:
  a frame being configured to be gripped, said frame comprising:
    a pair of vertical members, each of said vertical members having a first end and a second end, said pair vertical members including a first vertical member and a second vertical member,
    a top member extending between said vertical members, said top member being aligned with said first end corresponding to each of said vertical members wherein said top member is configured to be gripped,
    a bottom member extending between said vertical members, said bottom member being aligned with said second end corresponding to each of said vertical members, said bottom member extending laterally beyond each of said vertical members to define a primary end of said bottom member and a secondary end of said bottom member,
- a pair of first wheels, each of said first wheels being rotatably coupled to an associated one of said primary end and said secondary end of said bottom member wherein each of said first wheels is configured to be ruled along a support surface, and
- a pad being positioned around said top member, said pad being comprised of a resiliently compressible material wherein said pad is configured to enhance gripping said top member;

a pair of supports, each of said supports being pivotally coupled to said frame, each of said supports being selectively positioned in a first position having each of said supports extending away from said frame, each of said supports being selectively positioned in a second position having each of said supports resting against said frame, each of said supports comprising:
- a rod having a first end and a second end, said rod being curved between said first end and said second end of said rod, said first end of said rod being pivotally coupled to said frame, and
- a plurality of arms, each of said arms being coupled to and extending away from said rod, each of said arms having a distal end with respect to said rod, said distal end corresponding to each of said arms being pivotally coupled to said frame, each of said arms having a convex upper surface;

said pair of supports including a first support and a second support, said rod and each of said arms corresponding to said first support being positioned on said first vertical member of said frame, said rod in each of said arms corresponding to said second support being positioned on said second vertical member of said frame;

a base being pivotally coupled to said frame, said base being selectively positioned in a deployed position having said base being oriented perpendicular with respect to said frame such that said frame, said supports and said base defines a cart, said base being selectively positioned in a folded position having said base being oriented collinear with said frame, said base comprising:
- a pair of pivotal members, each of said pivotal members being pivotally coupled to said bottom member, each of said pivotal members having a distal end with respect to said bottom member, each of said pivotal members, each of said pivotal members being oriented perpendicular to said bottom member when said base is positioned in said deployed position,
- a front member being coupled to and extending between each of said pivotal members, said front member being aligned with said distal end corresponding to each of said pivotal members, said front member extending outwardly beyond each of said pivotal members to define a first end and a second end of said front member, said second end of said rod corresponding to each of said supports releasably engaging said front member when said base is positioned and said deployed position to retain said base and said deployed position, and
- a pair of second wheels, each of said second wheels being rotatably coupled to an associated one of said first end and said second end of said front member wherein each of said second wheels is configured to roll along the support surface when said base is positioned in said deployed position;

a plurality of boxes, each of said boxes being removably coupled between horizontally aligned pairs of said arms of said pair of supports wherein said plurality of boxes is vertically arranged between said pair of supports and wherein each of said boxes is configured to contain objects for transporting the objects in said cart, each of said boxes having a first lateral side, a second lateral side and a top edge, said top edge defining an opening in each of said boxes; and a plurality of engagements, each of said engagements being coupled to an associated one of said boxes, each of said engagements engaging and associated one of said arms on an associated one of said supports, said plurality of engagements having a distal end with respect to said associated box, each of said engagements being concavely arcuate between said associated box and said distal end of said engagements complementary to convexity of said upper surface of said associated arm such that each of said engagements conforms to said associated arm, each of said engagements being aligned with said top edge of said associated box, said plurality of engagements including a set of first engagements and a set of second engagements, each of said first engagements being positioned on said first lateral side of said associated box, each of said first engagements engaging said associated arm corresponding to said first support, each of said second engagements being positioned on said second lateral side of said associated box, each of said second engagements engaging said associated arm corresponding to said second support.

* * * * *